July 19, 1938.  R. O. HAMILL  2,123,943
RESET MECHANISM FOR DEMAND REGISTERS
Filed July 15, 1936   3 Sheets-Sheet 1

Inventor:
Ret O. Hamill
By: Brown, Jackson, Boettcher & Dienner.
Attys.

July 19, 1938.　　　　　R. O. HAMILL　　　　　2,123,943
RESET MECHANISM FOR DEMAND REGISTERS
Filed July 15, 1936　　　3 Sheets-Sheet 2
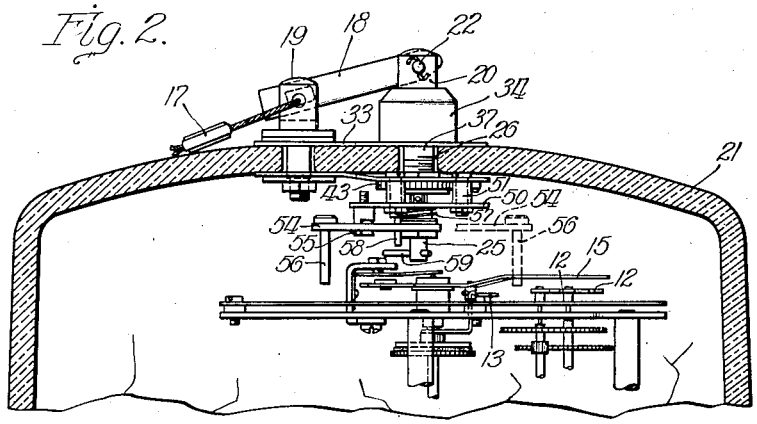
Fig. 2.
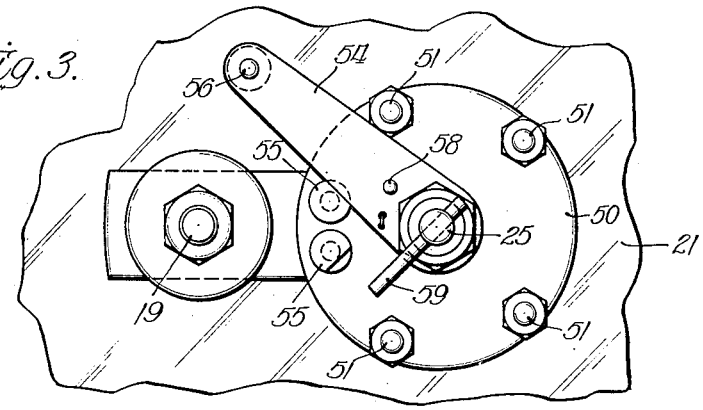
Fig. 3.
Fig. 7.
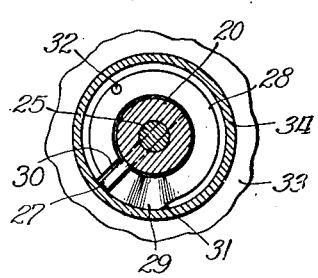
Fig. 8.
Inventor:
Ret O. Hamill
By: Brown, Jackson, Boettcher & Dienner
Attys.

July 19, 1938.                R. O. HAMILL                  2,123,943
                    RESET MECHANISM FOR DEMAND REGISTERS
                    Filed July 15, 1936          3 Sheets-Sheet 3
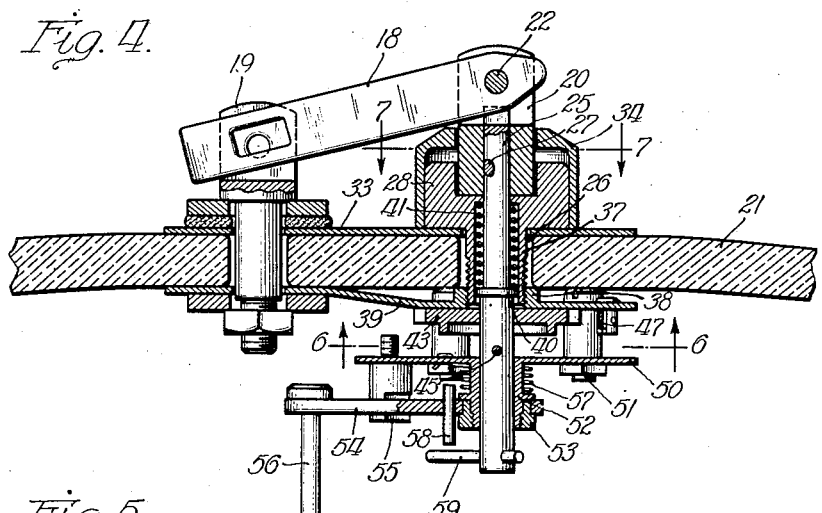
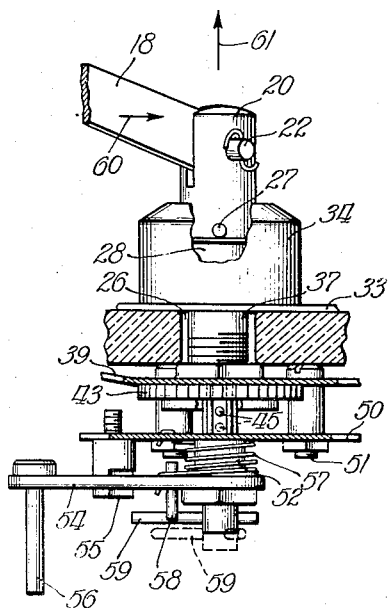
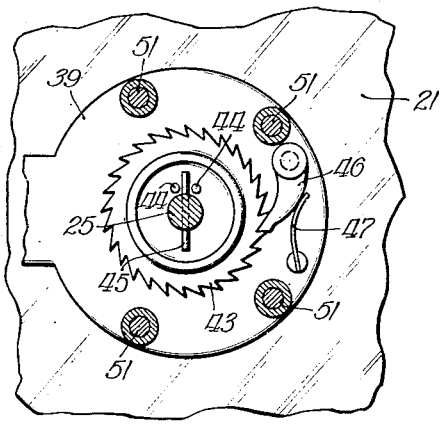
Inventor:
Ret O. Hamill Patented July 19, 1938

2,123,943

UNITED STATES PATENT OFFICE 2,123,943

RESET MECHANISM FOR DEMAND REGISTERS

Ret O. Hamill, Elmshurst, N. Y., assignor to Sangamo Electric Company, Springfield, Ill., a corporation of Illinois Application July 15, 1936, Serial No. 90,717

12 Claims. (Cl. 235—144)

My invention relates generally to resetting mechanisms and it has particular relation to such mechanisms as applied to watthour meters for restoring the maximum demand pointers to their initial positions.

A maximum demand pointer is provided on watthour meters to indicate the maximum load that has been connected to the circuit to which they are connected. The pointer is moved along a scale, calibrated in kilowatts for example, by an arm, which may be another pointer, that is driven by the power measuring mechanism of the meter. The arm is periodically reset by a timing device, such as an electric clock mechanism, so that the position of the arm at any time indicates the kilowatt demand during a particular interval at which the observation is made. The pointer, driven by the arm, is not restored to its initial position by the timing device but remains in the highest position to which it has been moved until it is manually reset.

At the time when the meter reading is taken the position of the maximum demand pointer is noted and the customer is billed accordingly. It is customary to impose a penalty if the demand exceeds a predetermined amount in order to compensate for the abnormal demand imposed on the system. The maximum demand pointer is then manually reset for operation during the next billing period.

The construction of the demand mechanism of a watthour meter is somewhat delicate and its calibration may be affected if the demand pointer is not carefully restored to its initial position. It is customary to provide a finger inside of the case of the watthour meter that is externally operable for restoring the pointer. The finger is arranged to be rotated by the meter-man in one direction to restore the maximum demand pointer and then to be rotated in the other direction to prepare it for the next resetting operation. If the meter-man is not careful he may reset the maximum demand pointer to a position beyond its actual initial position, or he may bend it or he may not restore it to the full initial position. It is, therefore, necessary for the meter-man to rotate an external knob or arm first in one direction and then in another direction in order to reset the maximum demand pointer. This he may or may not do carefully with the result that the demand mechanism may be injured.

It is, therefore, an object of my invention to provide a resetting mechanism for the maximum demand pointer of a watthour meter that shall be simple and efficient in operation and which can be readily and economically manufactured and installed.

The principal object of my invention is to provide for restoring the maximum demand pointer of a watthour meter to its initial position by manually rotating an external operating member through a single revolution.

An important object of my invention is to provide for rotating an external manually operable member on a watthour meter through a complete revoluton to move an internal finger through a partial revolution for resetting the maximum demand pointer to its initial position.

Another object of my invention is to provide for placing an externally operable finger of a watthour meter in driving engagement with the maximum demand pointer and automatically releasing the driving engagement when it has been restored to its initial position.

Still another object of my invention is to provide for preventing the rotation in one direction of an externally operable mechanism for resetting the maximum demand pointer of a watthour meter while permitting rotation in the other direction.

A specific object of my invention is to provide an external member on the cover of a watthour meter operable through a complete revolution for effecting driving engagement between an internal finger and the maximum demand pointer of the meter and automatically releasing the driving engagement when the maximum demand pointer is restored to its initial position to permit the finger to be biased to a position corresponding to the maximum position of the maximum demand pointer.

Other objects of my invention will in part be obvious and in part appear hereinafter.

My invention, accordingly, is disclosed in the embodiment hereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings in which:

Figure 2 is a view in side elevation of the reset mechanism mounted for operation in the cover of the watthour meter shown in Figure 1, the cover being shown in section;

Figure 3 is a bottom plan view, on an enlarged scale, of the reset mechanism;

Figure 4 is a view, partly in side elevation and partly in section, showing at an enlarged scale the details of construction of the reset mechanism;

Figure 5 is a view in side elevation of the reset mechanism showing how the reset function is performed;

Figure 6 is a view taken along the line 6—6 of Figure 4;

Figure 7 is a view taken along the line 7—7 of Figure 4; and

Figure 8 is a view in side elevation of the cam collar which is mounted on the outside of the cover of the watthour meter.

Figure 1:
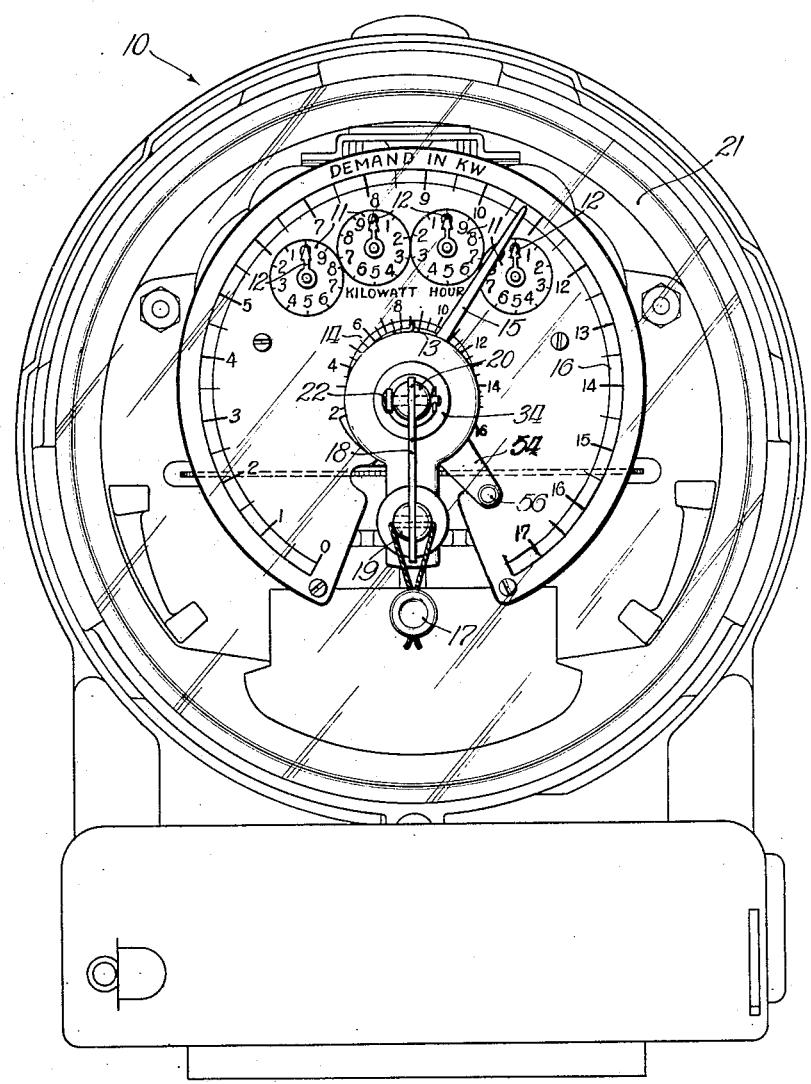
Figure 1 is a view, in front elevation, of a conventional type of watthour meter having a maximum demand mechanism and showing the application of my novel resetting mechanism.

According to my invention, I provide a finger mounted inside of the cover of a watthour meter and rotatable through substantially the same arc as the maximum demand pointer for engagement therewith. A spring is provided for biasing the finger to a position corresponding to the maximum position of the maximum demand pointer. The finger is rotated by means of a shaft which extends through the cover and which may be rotated manually by the meter-man. The shaft is mounted not only for rotation but is also mounted for translatory motion relative to the cover by means of a cam collar having a notch in its surface with which a transverse pin in the shaft is arranged to engage. One side of the notch is substantially perpendicular to the cam surface while the other side is inclined. As the shaft is rotated and the pin moves up the inclined side of the notch the shaft is moved outwardly to engage the finger which in turn engages the maximum demand pointer. The notch in the cam collar is so positioned that, when the maximum demand pointer has been restored to its initial position, the pin will be moved over the perpendicular side of the notch to permit the shaft to be moved inwardly under the influence of a biasing spring to release the driving engagement between it and the finger. The finger is then restored to its initial position by its spring and the operation may be repeated. It will be observed that the shaft which is rotated by the meter-man need only be rotated in one direction and that a complete revolution of it restores the maximum demand pointer to its original position. In order to prevent a reverse rotation of the shaft a ratchet wheel is provided which will permit rotation only in the direction required to reset the maximum demand pointer.

Referring now particularly to Figure 1 of the drawings, the reference character 10 designates, generally, a watthour meter of a conventional type having the customary dials 11 with which pointers 12, driven by the wattmeter mechanism, cooperate to indicate the kilowatt hours consumed in the circuit to which the meter is connected. In order to indicate the maximum demand during any interval, a maximum demand indicator 13 is provided and is arranged to cooperate with a scale 14. The maximum demand indicator 13 is driven by the wattmeter mechanism which drives the pointers 12. However, it is periodically reset, for example, every fifteen minutes, by means of a clock mechanism, such as an electric clock, so that its position at any time indicates the kilowatt demand up to the time that it is observed for that particular interval.

Since it is desirable to provide an indication of the maximum kilowatt demand in any interval in order to provide a proper basis for billing, a maximum demand pointer 15 is provided, the position of which is controlled by the maximum demand indicator 13. That is, the maximum demand pointer 15 is driven by engagement therewith, by the maximum demand indicator 13. However, when the maximum demand indicator 13 is restored to its initial position by the clock mechanism, the maximum demand pointer 15 remains in the position to which it has been moved by the maximum demand indicator 13. There is therefore a permanent indication of the maximum demand that has been applied to the circuit during any interval. As shown, the maximum demand pointer 15 is arranged to cooperate with the scale 16, which is calibrated the same as scale 14, so that the maximum demand may be readily noted.

The maximum demand pointer 15 is restored to its initial position each time that the meter reading is taken in order to provide a basis for charges for the next billing period, which is ordinarily one month. It is desirable that the meter-man be the only person who is permitted to restore the maximum demand pointer 15 to its initial position. In order to insure this a seal 17 is provided for securing an operating arm 18 in the slotted head of a stud 19. On removal of the operating arm 18 from the stud 19, the head 20 may be rotated by the meter-man to restore the pointer 15 to its initial position. The head 20 is provided with an extension, as will be hereinafter set forth, through a glass cover 21 which is usually provided over the registering and watt meter mechanism. As illustrated, the operating arm 18 is rotatably mounted in the head 20 by means of a pin 22.

Referring now particularly to Figures 2 and 4 of the drawings, it will be observed that the head 20 is mounted on a shaft 25 which extends through a suitable opening 26 in the cover 21. The head 20 may be secured against rotation relative to the shaft 25 by any suitable means such as by the provision of a slot in its upper end conforming to the slot in the head 20 in which the operating arm 18 is positioned.

The shaft 25 is not only rotatably mounted in the opening 26 in the cover 21 but it is also slidably mounted therein in order to perform a certain operating function as will be described hereinafter. In order to provide for slidably moving the shaft 25 a tapered pin 27 is provided which is more clearly illustrated in Figure 7 of the drawings. As there shown, the pin 27 extends through the head 20 and the shaft 25 to provide a further attachment therebetween and that one end thereof extends from one side of the head 20 to engage the upper surface of a cam collar 28, which is provided with a notch 29 having one side 30 disposed substantially perpendicular to the top surface while the other side 31 is inclined thereto. The construction and arrangement of the notch 29 is shown more clearly in Figure 8 of the drawings. As there shown a pin 32 is provided in the cam collar 28 for securing it in a predetermined position relative to a plate 33 that is mounted on the outer surface of the cover 21 and provided with suitable openings through which the stud 19 and the shaft 25 project into the interior of the meter. A cover 34, Figure 4, is provided around the head 20 and over the cam collar 28. The cam collar 28 is provided with an inwardly extending hollow sleeve 37, the lower end of which is threaded to engage an interiorly threaded portion 38 of a plate 39, which is similar to the plate 33 and which is disposed on the inner surface of the cover 21, as illustrated. It will be observed that the upper end of the shaft 25 is reduced in diameter somewhat from the diameter of the lower end and that a washer 40 is provided at the lower end of the reduced portion in engagement with the shoulder formed thereby. A compression coil spring 41 is provided around the upper end of the shaft 25 and between the under surface of the cam collar 28 and the washer 40 for biasing the shaft 25 inwardly and to maintain the pin 27 in engagement with the upper surface of the cam collar 28.

With a view to permitting rotation of the shaft 25 in one direction only a ratchet wheel 43, shown more clearly in Figure 6 of the drawings, is provided having a pair of inwardly extending pins 44 for engagement with a transverse pin 45 in the shaft 25. Since the shaft 25 not only rotates but also moves transversely relative to the cover 21, while the ratchet wheel 43 only rotates, this sliding connection is necessary. A pawl 46, biased by a spring 47, is provided for cooperating with the ratchet wheel 43 to permit rotation thereof in one direction only.

Underneath the plate 39 is a circular plate 50 depending therefrom and secured thereto by means of bolts 51. The plate 50 is provided with a downwardly extending hollow stem 52, the lower end of which is threaded for mounting a nut 53, which may be provided with a recess portion for mounting an operating finger 54. The movement of the operating finger 54 is limited by means of stops 55, shown more clearly in Figure 3 of the drawings, so that its movement corresponds substantially to the range of movement of the maximum demand pointer 15. A pin 56 carried at the outer end of the operating finger 54 is arranged to engage the maximum demand pointer 15 for restoring it to its initial position. It will be understood that the pin 56 may constitute an extension of the operating finger 54 and that it may be formed integrally therewith. In order to bias the operating finger 54 to a position corresponding to the maximum position of the maximum demand pointer 15, a coil spring 57 is provided, as illustrated in Figure 4 of the drawings, having one end secured to the plate 50 and the other end secured to the operating finger 54. The operating finger 54 is provided with a transverse pin 58 which is arranged to be engaged by an arm 59 carried by the lower end of the shaft 25. Driving engagement between the pin 58 and the arm 59 is effected only when the pin 27 is positioned out of engagement with the notch 29 in the cam collar 28. When the pin 27 is positioned in the notch 29, the arm 59 is moved out of the path of the pin 58 and the spring 57 is then effective to restore the operating finger 54 to its initial position.

During any billing period the maximum demand pointer 15 will be operated by the maximum demand indicator 13 to some such position as illustrated in Figure 1 of the drawings. After the meter-man has noted its position relative to the scale 16, he removes the seal 17 and moves the operating arm 18 out of the slotted head of the stud 19. As shown in Figures 4 and 8 of the drawings, when the operating arm 18 is in this position the pin 27 is positioned in the notch 29. As a result the operating arm 59 is positioned out of the path of the pin 58 since the shaft 25 is in its innermost position as biased by the spring 41. As the operating arm 18 is rotated in a counter-clockwise direction, as indicated by the arrow 60 in Figure 5 of the drawings, the pin 27 rides up the inclined surface 31 to move the shaft 25 in the direction indicated by the arrow 61, thereby moving the arm 59 from its position shown by the broken lines in this figure to a position where it will engage the pin 58 of the operating finger 54. At this time, the operating finger 54 is in the position shown in Figure 1 of the drawings which corresponds to the maximum position to which the maximum demand pointer 15 can be operated. The continued rotation of the operating arm 18 causes the pin 56 to engage the maximum demand pointer 15 at whatever position it may be located and it is restored to its initial position. A rotation of the shaft 25 in a reverse direction is prevented by the ratchet wheel 43 and its cooperating pawl 46. As the operating finger 54 is moved to restore the maximum demand pointer 15 to its initial position, the coil spring 57 is stressed.

The cam collar 28 is so positioned that, when the maximum demand pointer 15 has been restored to its initial position the pin 27 will pass the perpendicular side 30 of the notch 29 and the shaft 25 will be moved inwardly under the biasing force of the spring 41. The operating arm 59 is then moved out of driving engagement with the pin 58 and the operating finger 54 is restored to its initial position by the spring 57. The operating arm 18 will have moved to one complete revolution and it may be restored to its position in the stud 19 and resealed.

It will now be observed that I have provided a resetting mechanism for the maximum demand pointer of a watthour meter which requires a minimum of attention and care on the part of the meter-man to restore to the initial position when the meter reading is taken. He is only required to rotate the external operating member through one complete revolution during which the maximum demand pointer will be picked up by the operating finger, restored thereby to the initial position and the driving connection between the operating finger and the maximum demand pointer will be automatically released at the proper instant to leave the maximum demand pointer at exactly the desired position.

Since further changes which may be made in the foregoing construction and different embodiments of the invention may be made without departing from the scope thereof, it is intended that all matter shown in the accompanying drawings or set forth in the foregoing description shall be interpreted as illustrative and not in a limiting sense.

I claim as my invention:

1. A mechanism for resetting a rotatable member to its initial position comprising, in combination, means for engaging said member to restore it to its initial position, manually operable means movable through a complete revolution, means for placing said manually operable means in driving engagement with said member engaging means, and means for automatically releasing said driving engagement when said member is restored to its initial position.

2. A mechanism for resetting the maximum demand pointer of a watthour meter to its initial position comprising, in combination, means for engaging said pointer to restore it to its initial position, manually operable means rotatable only in one direction, connecting means disposed to interconnect said pointer engaging means and said manually operable means on rotation of the latter from its initial position, and means for automatically disconnecting said connecting means from said pointer engaging means on restoration of said pointer to the initial position thereof.

3. A mechanism for resetting the maximum demand pointer of a watthour meter to its initial position comprising, in combination, means for engaging said pointer to restore it to its position, manually operable means movable through a complete revolution, ratchet means disposed to cooperate with said manually operable means for preventing rotation thereof in one direction while permitting rotation in the other direction, means for placing said manually operable means in driving engagement with said pointer engaging means, and means for automatically releasing said driving engagement when said pointer is restored to its initial position.

4. A mechanism for resetting the maximum demand pointer of a watthour meter to the initial position comprising, in combination, a finger disposed to engage said pointer for restoring it to the initial position thereof and rotatable through substantially the same arc as said pointer, manually operable means movable through a complete revolution, means for placing said manually operable means in driving engagement with said finger, and means for automatically releasing said driving engagement when said pointer is restored to its initial position.

5. A mechanism for resetting the maximum demand pointer of a watthour meter to the initial position comprising, in combination, a finger disposed to engage said pointer for restoring it to the initial position thereof and rotatable through substantially the same arc as said pointer, manually operable means movable through a complete revolution, ratchet means disposed to cooperate with said manually operable means for preventing rotation thereof in one direction while permitting rotation in the other direction, means for placing said manually operable means in driving engagement with said finger, and means for automatically releasing said driving engagement when said pointer is restored to its initial position.

6. A mechanism for resetting the maximum demand pointer of a watthour meter to the initial position comprising, in combination, a finger disposed to engage said pointer for restoring it to the initial position thereof and rotatable through substantially the same arc as said pointer, manually operable means movable through a complete revolution, means for placing said manually operable means in driving engagement with said finger, means for automatically releasing said driving engagement when said pointer is restored to its initial position, and means for restoring said finger to its initial position on release of said driving engagement.

7. A mechansm for resetting the maximum demand pointer of a watthour meter to the initial position comprising, in combination, a finger disposed to engage said pointer for restoring it to the initial position thereof and rotatable through substantially the same arc as said pointer, manually operable means movable through a complete revolution, ratchet means disposed to cooperate with said manually operable means for preventing rotation thereof in one direction while permitting rotation in the other direction, means for placing said manually operable means in driving engagement with said finger, means for automatically releasing said driving engagement when said pointer is restored to its initial position, and resilient means for biasing said finger to its initial position when said driving engagement is released.

8. A mechanism for mounting on the cover of a watthour meter to reset the maximum demand pointer to the initial position comprising, in combination, a rotatably mounted shaft extending through said cover, means manually operable exteriorly of said cover for moving said shaft through a complete revolution, a finger disposed to engage said pointer for restoring it to its initial position, said finger being mounted for rotation through substantially the same arc as said pointer, means for effecting a driving connection between said shaft and said finger to restore said pointer, and means for automatically releasing said driving connection when said pointer is restored to its initial position.

9. A mechanism for mounting on the cover of a watthour meter to reset the maximum demand pointer to the initial position comprising, in combination, a rotatably mounted shaft extending through said cover, means manually operable exteriorly of said cover for moving said shaft through a complete revolution, a finger disposed to engage said pointer for restoring it to its initial position, said finger being mounted for rotation through substantially the same arc as said pointer, resilient means for biasing said finger to an initial position corresponding to the maximum position of said pointer, means for effecting a driving connection between said shaft and said finger to move them against the biasing force of said resilient means, and means for automatically releasing said driving connection when said pointer is restored to its initial position to permit said finger to move under the influence of said resilient means to its initial position.

10. A mechanism for mounting on the cover of a watthour meter to reset the maximum demand pointer to the initial position comprising, in combination, a rotatably mounted shaft extending through said cover, means manually operable exteriorly of said cover for moving said shaft through a complete revolution, ratchet means disposed to cooperate with said shaft to prevent rotation thereof in one direction while permitting rotation in the opposite direction, a finger disposed to engage said pointer for restoring it to the initial position thereof, said finger being mounted for rotation about the axis of said shaft through substantially the same arc as said pointer, resilient means for biasing said finger to an initial position corresponding to the maximum position of said pointer, means for effecting a driving connection between said shaft and said finger to move them against the biasing force of said resilient means, and means for automatically releasing said driving connection when said pointer is restored to its initial position to permit said finger to move under the influence of said resilient means to its initial position.

11. A mechanism for mounting on the cover of a watthour meter to reset the maximum demand pointer to its initial position comprising, in combination, a shaft rotatably and slidably mounted in said cover, means manually operable exteriorly of said cover for moving said shaft through a complete revolution, a cam collar disposed around said shaft between said manual means and said cover and provided with a notch in its upper surface having one side disposed substantially at right angles and the other side inclined thereto, a pin carried by said shaft for engagement with said cam surface, a coil spring around said shaft for biasing said pin into engagement with said cam surface, a finger disposed to engage said pointer for restoring it to its initial position, said finger being mounted for rotation about the axis of said shaft through substantially the same arc as said pointer, a pin carried by said finger, and an arm carried by the inner end of said shaft at right angles thereto, said pin on said finger being disposed out the path of said arm when said first mentioned pin is positioned in said notch.

12. A mechanism for mounting on the cover of a watthour meter to reset the maximum demand pointer to its initial position comprising, in combination, a shaft rotatably and slidably mounted in said cover, means manually operable exteriorly of said cover for moving said shaft through a complete revolution, a cam collar disposed around said shaft between said manual means and said cover and provided with a notch in its upper surface having one side disposed substantially at right angles and the other side inclined thereto, a pin carried by said shaft for engagement with said cam surface, a coil spring around said shaft for biasing said pin into engagement with said cam surface, a ratchet wheel carried by said shaft, a pawl disposed to cooperate with said ratchet wheel to prevent rotation of said shaft in one direction while permitting rotation in the other direction, a finger disposed to engage said pointer for restoring it to its initial position, said finger being mounted for rotation about the axis of said shaft through substantially the same arc as said pointer, resilient means for biasing said finger to an initial position corresponding to the maximum position of said pointer, a pin carried by said finger, and an arm carried by the inner end of said shaft at right angles thereto for engaging said pin carried by said finger when said shaft is rotated to cause said pin carried thereby to move up the inclined side of said notch for moving said finger and said pointer against the biasing force of said resilient means until said pin is returned to said notch, whereupon said arm is moved out of driving engagement with said finger permitting it to return to its initial position under the influence of said resilient means.

RET O. HAMILL.